United States Patent
Angermaier

[11] Patent Number: 6,142,011
[45] Date of Patent: Nov. 7, 2000

[54] METHOD FOR ADAPTING MECHANICAL TOLERANCES WHEN PERFORMING TIME MEASUREMENTS ON ROTATING SHAFTS

[75] Inventor: Anton Angermaier, Thann, Germany

[73] Assignee: Siemens Aktiengesellschaft, Munich, Germany

[21] Appl. No.: 09/234,607

[22] Filed: Jan. 21, 1999

[30] Foreign Application Priority Data

Jan. 21, 1998 [DE] Germany ............. 198 02 109

[51] Int. Cl.$^7$ .................................. G01M 15/00
[52] U.S. Cl. .................................. 73/116
[58] Field of Search .................. 73/116, 117.2, 73/117.3, 119 R

[56] References Cited

U.S. PATENT DOCUMENTS

| | | | |
|---|---|---|---|
| 5,377,535 | 1/1995 | Angermaier et al. | 73/116 |
| 5,428,991 | 7/1995 | Klenk et al. | 73/116 |
| 5,696,316 | 12/1997 | Mezger et al. | 73/116 |
| 5,789,658 | 8/1998 | Henn et al. | 73/116 |
| 5,979,413 | 11/1999 | Ohnuma et al. | 73/116 |

FOREIGN PATENT DOCUMENTS

| | | |
|---|---|---|
| 0583495B1 | 2/1994 | European Pat. Off. . |
| 4133679A1 | 4/1993 | Germany . |
| 19544720C1 | 3/1997 | Germany . |

*Primary Examiner*—Eric S. McCall
*Attorney, Agent, or Firm*—Herbert L. Lerner; Laurence A. Greenberg; Werner H. Stemer

[57] ABSTRACT

A method for adapting mechanical tolerances when performing time measurements on rotating shafts includes assigning each two cylinders to a respective mechanical segment on a crankshaft sensor wheel, and obtaining two adaptation values for the same mechanical segment in order to correct segment times. If a difference between these two adaptation values is greater than a predefined threshold value, the adaptation increment is rejected as invalid. As a result, disruptive oscillations, such as may occur when a crankshaft with a two-mass flywheel is used, can be gated out during the adaptation of the measured time values.

8 Claims, 2 Drawing Sheets

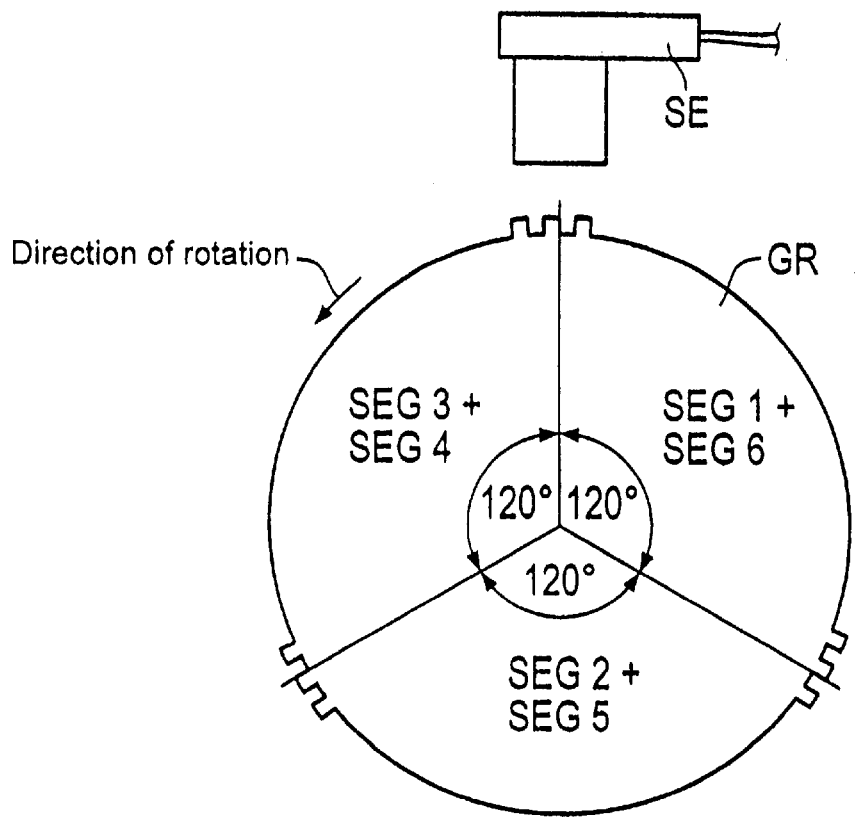

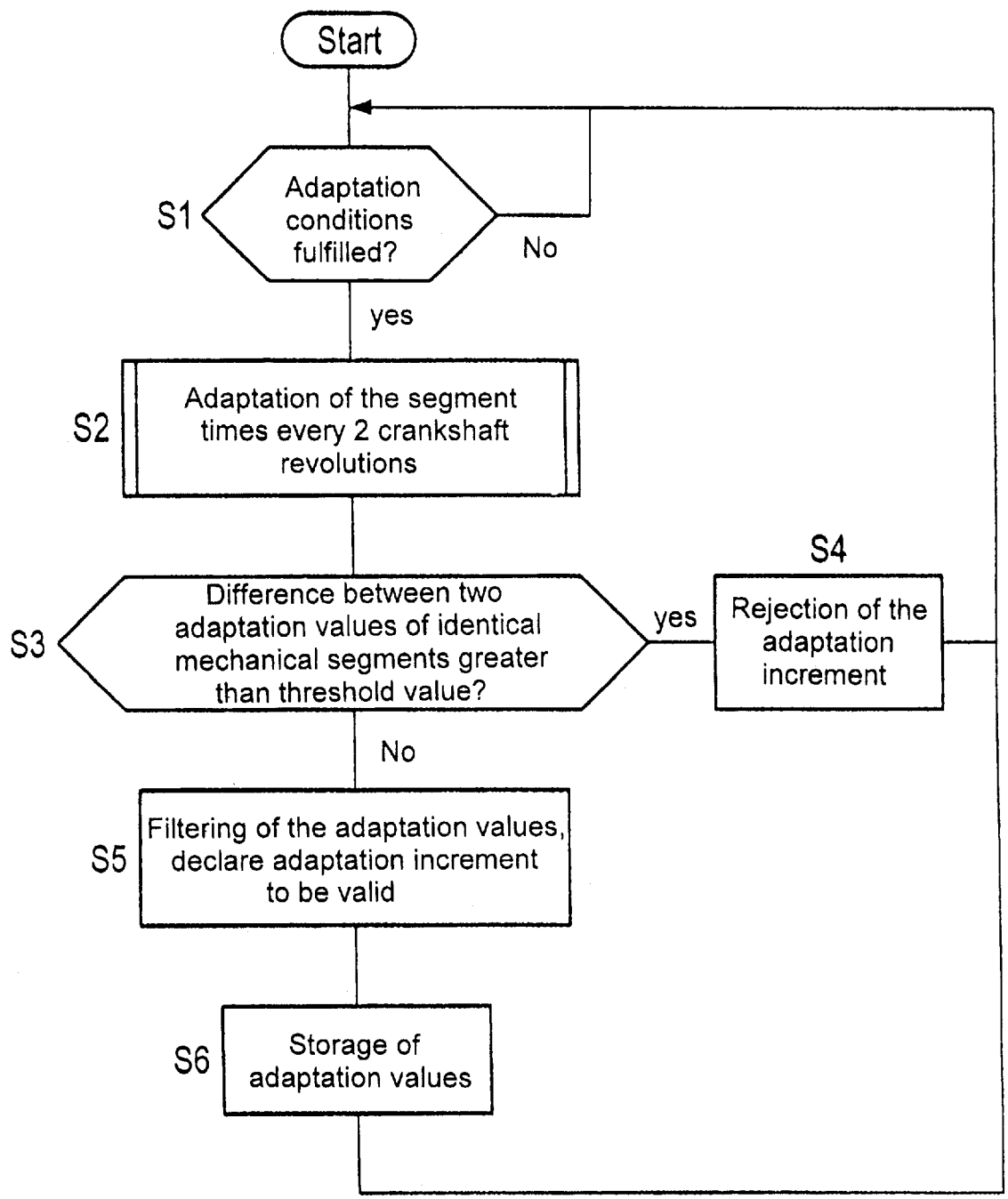

METHOD FOR ADAPTING MECHANICAL TOLERANCES WHEN PERFORMING TIME MEASUREMENTS ON ROTATING SHAFTS

BACKGROUND OF THE INVENTION

FIELD OF THE INVENTION

The invention relates to a method for adapting mechanical tolerances when performing time measurements on rotating shafts, in particular on internal combustion engine crankshafts or shafts connected thereto.

One possible way of measuring time is by providing the shaft itself, or preferably a sensor wheel connected thereto, with marks and scanning the marks through the use of a sensor. The time within which the shaft rotates through a specific angle of rotation or through a specific segment is measured. In that way, fluctuations in rotational speed are sensed to a very high resolution, in addition to the rotational speed, as a function of the distance between the marks on the periphery of the shaft or the sensor wheel.

Such measurements are used, for example, in internal combustion engines, in order to detect combustion misfires by reference to a brief slowing down of the angular speed of the crankshaft. However, if the marks or the sensor wheel have mechanical faults or inaccuracies, such as, for example, angular faults of the segments or faults in marking teeth on the sensor wheel, eccentricity of the disk or deviations in the tooth shape, the measurement of the angular speed is falsified. As a consequence thereof, misdiagnoses may be made when detecting combustion misfires.

The determination of adaptation values for correcting such faults is described, for example, in European Patent EP 0 583 495 B1 which is assigned to the assignee of the instant application.

In that method, the segment times are measured for a reference segment at an interval of two crankshaft revolutions. In that way it is possible to compensate for a general change in the tendency of the rotational speed, which would otherwise lead to faulty corrections. The further segment times which are measured between those two measurements are compared with the segment time of the reference segment, and a correction value, which makes it possible to correct the measured segment time on a cylinder-specific basis, is determined as a function of the calculated time difference.

Under certain circumstances, it is possible for maladaptations to occur with the known methods according to the prior art, for example in internal combustion engines which are equipped with a two-mass flywheel on the crankshaft. In addition to relieving the crankshaft of unacceptable bending stresses, such a two-mass flywheel brings about an improvement in the acoustics and the sensation of comfort. The two-mass flywheel may be embodied as a spring-mass system, and thus have a natural frequency which is dependent, inter alia, on the spring stiffness, on the two masses and on the coefficients of friction. At critical rotational speeds of the internal combustion engine (for example 2500 rpm), a superimposition of oscillations may then occur, in particular if an oscillation is superimposed on the 1.5 order of engine. That oscillation disrupts the adaptation algorithm and leads to faulty adaptation of the measured time values, as a result of which combustion misfires are incorrectly detected.

SUMMARY OF THE INVENTION

It is accordingly an object of the invention to provide a method for adapting mechanical tolerances when performing time measurements on rotating shafts, which overcomes the hereinafore-mentioned disadvantages of the heretofore-known methods of this general type and which improves the adaptation method known from the prior art so that accurate time measurement is ensured even when there are superimposed oscillations.

With the foregoing and other objects in view there is provided, in accordance with the invention, a method for adapting mechanical tolerances when performing time measurements on rotating shafts, in particular on crankshafts or a shaft connected thereto, in an internal combustion engine having a plurality of cylinders, which comprises dividing the shaft, or a sensor wheel connected to the shaft, into mechanical segments; assigning each two cylinders to a respective one of the mechanical segments; scanning the segments with a sensor assigned to the segments; measuring segment times required by the shaft to rotate through a defined angular range; determining adaptation values for correcting the segment times from the measured segment times, for every two revolutions of the shaft; defining an adaptation increment by determining a difference between two adaptation values of identical mechanical segments and comparing the difference with a predefined threshold value; and evaluating the adaptation increment as valid or as invalid as a function of a result of the comparison.

In accordance with another mode of the invention, there is provided a method which comprises forming an absolute value of the difference between the two adaptation values, and rejecting the adaptation increment as invalid when the threshold value is exceeded.

In accordance with a further mode of the invention, there is provided a method which comprises forming an absolute value of the difference between the two adaptation values, and filtering and storing the adaptation values when the threshold value is exceeded.

In accordance with an added mode of the invention, there is provided a method which comprises calculating the adaptation values in an overrun fuel cut-off operating state of the internal combustion engine.

In accordance with an additional mode of the invention, there is provided a method which comprises calculating the adaptation values only within predefinable rotational speed limits.

In accordance with yet another mode of the invention, there is provided a method which comprises calculating the adaptation values only if a rotational speed gradient of the internal combustion engine lies below a predefined limit value.

In accordance with a concomitant mode of the invention, there is provided a method which comprises determining the threshold value experimentally with driving trials.

Two adaptation values are obtained for the same mechanical segment by assigning two cylinders to each mechanical segment on the shaft or on a sensor wheel connected to the shaft. If the difference between these two adaptation values is greater than a predefined threshold value, the adaptation increment is rejected as being invalid. Disruptive oscillations, such as may occur when a crankshaft with a two-mass flywheel is used, can be gated out or extracted during the adaptation of the measured time values by suitably applying the threshold value.

Other features which are considered as characteristic for the invention are set forth in the appended claims.

Although the invention is illustrated and described herein as embodied in a method for adapting mechanical tolerances when performing time measurements on rotating shafts, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, elevational view of a sensor wheel with an associated sensor for a 6-cylinder internal combustion engine;

FIG. 2 is a table showing deviations of adaptation values assigned to segments relative to those for a reference segment; and FIG. 3 is a flowchart for an adaptation method according to the invention.

DESCRIPTION OF THE PREFERRED EMBODIMENTS

Referring now to the figures of the drawings in detail and first, particularly, to FIG. 1 thereof, there is seen a sensor wheel which has ferromagnetic teeth, is mounted on a non-illustrated crankshaft of a 6-cylinder internal combustion engine and is designated by reference symbol GR. During the rotary movement of the crankshaft, an inductive sensor SE generates a voltage signal which fluctuates with the distance from the front surface of the gearwheel. The sensor wheel GR thus forms a modulator for converting an input variable of the angular speed, which is analogous with the amplitude, into a signal which is analogous with the frequency. Zero crossover points of this signal also contain information on the instantaneous angle. A magnetic field changes as a result of a sequence of tooth gaps and of teeth of the sensor wheel GR.

Removing one or more teeth on the sensor wheel GR makes it is possible to obtain a region for an angular reference which can be used to determine an absolute angle. Sixty teeth minus a gap of two teeth has become established as the standard for pulse transmitters on the crankshaft of internal combustion engines.

The sensor wheel GR illustrated in FIG. 1 for a 6-cylinder internal combustion engine is divided into three segments which each include 120° corresponding to a complete working cycle of two crankshaft revolutions (720°). In this case, the cylinders 1 and 6 are assigned to a segment SEG 1+6, the cylinders 2 and 5 are assigned to a segment SEG 2+5, and the cylinders 3 and 4 are assigned to a segment SEG 3+4. This division of the segments applies to a 6-cylinder internal combustion engine with an ignition sequence 1-5-3-6-2-4. The direction of rotation of the sensor wheel GR is indicated with an arrow symbol.

In this example, the segment SEG 1 is defined as fault-free and thus serves as a reference for the other segments. However, it is also possible to select any desired segment as the reference segment. Advantageously, the first in the ignition sequence of the cylinders is selected. Due to the fact that the mechanical segment for the cylinders 1 and 6 is identical, adaptation values for the segment SEG 1+6 are approximately the same. Since the segment SEG 2+5 is assigned to the cylinders 2 and 5, the adaptation values for the segment SEG 2+5 are also approximately the same. The same applies to the segment SEG 3+4. In this case, the adaptation values for the segment 3 and 4 are approximately the same.

FIG. 2 shows, by way of example, a table in which relative deviations of the adaptation values of the individual segments from the adaptation value of the reference segment SEG 1 are entered for a specific internal combustion engine. Small differences between the values for the respective pairs SEG 1+6 (cylinder CYL 1+6), SEG 2+5 (cylinder CYL 2+5), SEG 3+4 (cylinder CYL 3+4) are due to measurement inaccuracies, noise and faults which cannot be influenced.

If an oscillation with a frequency on the 1.5 order of engine is superimposed, the adaptation values of identical mechanical segments differ significantly more than is specified in the table according to FIG. 2, and it is possible to gate out or extract the adaptation values.

The sequence of the adaptation method is explained in more detail below with reference to FIG. 3.

In a first method step S1, a check is performed as to whether or not predefined adaptation conditions are fulfilled. As was already described at the outset, time deviations during successive measurements of angular segments may have different causes. They may be due to an actual change in the angular speed of the crankshaft or else they may be due to segment sizes between individual crankshaft marks being unequal due to a fault. In order to be sure that the measured differences are actually due to different segment sizes, influences which are caused by ignition and combustion have to be excluded. The detection and correction of faults in accordance with the method of the invention are therefore preferably carried out during an overrun fuel cut-off operating state.

The adaptation method can also be restricted to a specific rotational speed range of the internal combustion engine in order to avoid internal combustion engine-specific faults in specific rotational speed ranges. In order to prevent the possible occurrence of a maladaptation at a rotational speed which changes markedly, the calculation of new adaptation values can also be gated out in such highly unsteady operating states.

This repeated interrogation in method step S1 is executed in a waiting loop.

If the adaptation conditions are fulfilled, an adaptation of the segment times is carried out every two crankshaft revolutions in a method step S2 using any desired method. For this purpose, it is suitable to use any known method with which times are measured within which the sensor wheel rotates through a predefined angle or segment and from the values of which, that are obtained and derived in this way, a correction factor (adaptation factor) is derived. The only essential consideration is that during the given division of the segments, adaptation values are calculated during ore complete working cycle, corresponding to two revolutions of the crankshaft.

Preferably, a method is used such as is described in European Patent EP 0 583 495 B1. In that case, those values such as were stored as the last values determined during the last operation of the internal combustion engine, are available as adaptation values for the start of operation. After new adaptation values have been determined, those old adaptation values are overwritten. During the very first operation of the internal combustion engine, initialization values, preferably zero, are preassigned to the adaptation values.

Subsequently, the segment time of the current segment is measured and a check is performed as to whether or not the measured segment time was the time of the reference segment (SEG 1). This segment is defined as fault-free. If the segment time of the reference segment was not measured, the next segment time is measured. This is repeated until the reference segment occurs. If this is the case, the instantaneously measured segment time is stored as the segment time of the reference segment.

The segment times of the successive segments, which are logically assigned to the individual cylinders of the internal combustion engine, are then measured in succession in the following method steps.

Once the segment time has been determined for all of the segments assigned to the individual cylinders, the segment time of the reference segment is in turn measured and stored, but then two revolutions of the crankshaft later.

In the following method steps, the adaptation values for the individual segments which are assigned to the cylinders are determined in succession, as is specified, for example, in European Patent EP 0 583 495 B1. In that way, adaptation values are obtained, and they are further processed in a method step S3 of the method according to the invention.

In the method step S3 a test is carried out as to whether or not a difference between two adaptation values of the same mechanical segment is greater than a predefined threshold value. For this purpose, for example, an absolute value of the difference between the adaptation value of the segment SEG 5 and the adaptation value of the segment SEG 2 is formed. If this absolute value is greater than the threshold value which is applied on the vehicle testbed through the use of trials or through the use of fleet tests, this adaptation increment is rejected as being invalid in a method step S4.

The same procedure is adopted if the absolute value of the difference between the adaptation value of the segment SEG 3 and the adaptation value of the segment SEG 4 or the absolute value of the difference between the adaptation value of the segment SEG 1 and the adaptation value of the SEG 6 is greater than the threshold value. Due to the reasons mentioned at the outset, it is not possible to adapt the measured time values reliably. The method is continued again with the method step S1.

However, if the result of the interrogation in method step S3 is that in each case the difference between two adaptation values of identical mechanical segments is smaller than the threshold value, the adaptation increment is declared to be invalid and the adaptation values are filtered in a method step 5. The filtering can be carried out, for example, through the use of a sliding averaging, such as is described in European Patent EP 0 583 495 B1.

Averaging is recommended since the systematic faults of the segments may have random faults superimposed on them such as fluctuations in the system clock on which the control system is based, tolerances in the switching precision of the sensors, general oscillations or disruptions originating from the drive train.

The adaptation values which are obtained in this way are stored by overwriting the old values in the method step S6. Subsequently, the system branches to the start of the method at the method step S1.

The method has been explained with reference to a 6-cylinder internal combustion engine. However, it can also be applied in an analogous manner to internal combustion engines with a different number of cylinders, for example 4, 8 or 12. All that is necessary is to appropriately adapt the division of the segments and the assignment of the cylinders.

I claim:

1. In a method for adapting mechanical tolerances when performing time measurements on a rotating shaft of an internal combustion engine having a plurality of cylinders, the improvement which comprises:

dividing the shaft into mechanical segments;

assigning two cylinders to a respective one of the mechanical segments;

scanning the segments with a sensor assigned to the segments; measuring segment times required by the shaft to rotate through a defined angular range;

determining adaptation values for correcting the segment times from the measured segment times, for every two revolutions of the shaft;

defining an adaptation increment by determining a difference between two adaptation values of identical mechanical segments and comparing the difference with a predefined threshold value; and evaluating the adaptation increment as valid or as invalid as a function of a result of the comparison.

2. The method according to claim 1, which comprises carrying out the step of dividing the shaft into mechanical segments by dividing a sensor wheel connected to the shaft.

3. The method according to claim 1, which comprises forming an absolute value of the difference between the two adaptation values, and rejecting the adaptation increment as invalid when the threshold value is exceeded.

4. The method according to claim 1, which comprises forming an absolute value of the difference between the two adaptation values, and filtering and storing the adaptation values when the threshold value is exceeded.

5. The method according to claim 1, which comprises calculating the adaptation values in an overrun fuel cut-off operating state of the internal combustion engine.

6. The method according to claim 1, which comprises calculating the adaptation values only within predefinable rotational speed limits.

7. The method according to claim 1, which comprises calculating the adaptation values only if a rotational speed gradient of the internal combustion engine lies below a predefined limit value.

8. The method according to claim 1, which comprises determining the threshold value experimentally with driving trials.

* * * * *